(12) United States Patent
Kim et al.

(10) Patent No.: US 8,709,632 B2
(45) Date of Patent: Apr. 29, 2014

(54) BATTERY MODULE

(75) Inventors: Sung-Bae Kim, Suwon-si (KR);
Yong-Sam Kim, Suwon-si (KR);
Sang-Won Byun, Suwon-si (KR);
Hyo-Seob Kim, Suwon-si (KR);
Byung-Kyu Ahn, Suwon-si (KR)

(73) Assignees: Samsung SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 633 days.

(21) Appl. No.: 12/801,474

(22) Filed: Jun. 10, 2010

(65) Prior Publication Data

US 2011/0117402 A1    May 19, 2011

Related U.S. Application Data

(60) Provisional application No. 61/272,880, filed on Nov. 13, 2009.

(51) Int. Cl.
| | |
|---|---|
| *H01M 6/10* | (2006.01) |
| *H01M 2/00* | (2006.01) |
| *H01M 2/10* | (2006.01) |

(52) U.S. Cl.
USPC .................... 429/94; 429/163; 429/246

(58) Field of Classification Search
None
See application file for complete search history.

(56) References Cited

U.S. PATENT DOCUMENTS

| | | | |
|---|---|---|---|
| 1,486,434 A * | 3/1924 | Holden | 429/99 |
| 3,553,033 A | 1/1971 | Page | |
| 3,823,037 A | 7/1974 | Cairns et al. | |
| 4,008,356 A | 2/1977 | Asano | |
| 4,982,925 A * | 1/1991 | Hinderliter | 248/455 |
| 5,756,229 A * | 5/1998 | Pyszczek et al. | 429/94 |
| 6,723,466 B2 * | 4/2004 | Oogami et al. | 429/94 |
| 7,485,392 B2 | 2/2009 | Kim | |
| 2004/0191612 A1 * | 9/2004 | Akita et al. | 429/94 |
| 2006/0068276 A1 | 3/2006 | Yoo et al. | |
| 2006/0099504 A1 | 5/2006 | Kim | |
| 2008/0107961 A1 | 5/2008 | Jeong et al. | |
| 2009/0011329 A1 | 1/2009 | Yoon | |

FOREIGN PATENT DOCUMENTS

| | | |
|---|---|---|
| JP | 10-189027 A | 7/1998 |
| JP | 2006-202888 A | 8/2006 |
| JP | 2008-004274 A | 1/2008 |
| KR | 10-2006-0028171 A | 3/2006 |
| KR | 10-2006-0037602 A | 5/2006 |
| KR | 10-2007-0027354 A | 3/2007 |
| KR | 10-2008-0016049 A | 2/2008 |

OTHER PUBLICATIONS

Extended Search Report in EP 10189768.4—2119, dated Apr. 6, 2011 (Kim, et al.).
Office Action issued in corresponding Korean application, 10-2010-0066409, dated Sep. 6, 2011.
Japanese Office Action Dated Dec. 18, 2012.

* cited by examiner

*Primary Examiner* — Patrick Ryan
*Assistant Examiner* — Christopher Domone
(74) *Attorney, Agent, or Firm* — Lee & Morse, P.C.

(57) ABSTRACT

A battery including a battery case, an electrode assembly in the battery case, the electrode assembly including a plurality of windings that are wound about a winding axis, the winding axis being oriented parallel to a bottom surface of the battery case, and a deformable member between the electrode assembly and the bottom surface of the battery case, the deformable member being pressed between the electrode assembly and the bottom surface of the battery case.

18 Claims, 7 Drawing Sheets

BATTERY MODULE

CROSS-REFERENCE TO RELATED APPLICATION

This application claims priority to pending U.S. Provisional Application No. 61/272,880, filed in the U.S. Patent and Trademark Office on Nov. 13, 2009, and entitled "BATTERY MODULE," which is incorporated by reference herein in its entirety and for all purposes.

BACKGROUND

1. Field

Embodiments relate to a battery and a battery module including the same.

2. Description of the Related Art

Unlike primary batteries, secondary batteries generally may be rechargeable.

A secondary battery may be used as an energy source for mobile devices such as laptop computers and mobile phones, electric automobiles, hybrid electric automobiles, electric bicycles, and uninterruptible power supplies.

In a medium-large sized device, such as in an electric or hybrid electric automobile, a battery module, in which a plurality of battery cells are electrically connected to each other, is generally used due to the need for high output and high-capacity.

SUMMARY

Embodiments are therefore directed to a battery and a battery module including the same, which substantially overcome one or more of the problems due to the limitations and disadvantages of the related art.

It is therefore a feature of an embodiment to provide a battery having provisions to prevent movement of an electrode assembly in a case, so as to reduce the effects of vibration, and a battery module including the same.

At least one of the above and other features and advantages may be realized by providing a battery, including a battery case, an electrode assembly in the battery case, the electrode assembly including a plurality of windings that are wound about a winding axis, the winding axis being oriented parallel to a bottom surface of the battery case, and a deformable member between the electrode assembly and the bottom surface of the battery case, the deformable member being pressed between the electrode assembly and the bottom surface of the battery case.

The electrode assembly may have an outermost winding, the outermost winding of the electrode assembly may be a separator, and the separator may contact the deformable member.

The electrode assembly may include a second plurality of windings that are wound about a second winding axis, the second winding axis being oriented parallel to the winding axis, and the deformable member may have lateral support portions that press against the winding and the second winding.

The deformable member may have at least one central support portion disposed between the lateral support portions, the central support portion being configured to press against a central region of the electrode assembly.

The deformable member may have a W shape, the center of the W forming a central support portion disposed between the plurality of windings and the second plurality of windings.

The deformable member may include lateral support portions that contact lower side regions of the electrode assembly, the lateral support portions of the deformable member may be coupled to one another, and the deformable member may be a single integrated member.

The deformable member may be a preformed plate, ends of the plate being bent so as to extend away from the bottom surface of the battery case, the ends of the plate forming the lateral support portions.

The lateral support portions of the deformable member may press against sides of the battery case.

The deformable member may have a length in the winding axis direction that corresponds to that of the electrode assembly.

The deformable member may not be fixed to the electrode assembly and may not be fixed to the battery case, such that the deformable member floats between the electrode assembly and the battery case.

The battery may further include a cap plate coupled to the battery case, the cap plate having at least one electrode terminal extending therethrough, the electrode assembly being coupled to the at least one electrode terminal. The cap plate may be disposed at an end of the battery case that is opposite to the deformable member.

The deformable member may be electrically insulating.

The deformable member may include at least one of silicone, rubber, and polypropylene.

At least one of the above and other features and advantages may also be realized by providing a battery, including a battery case, an electrode assembly in the battery case, and a retainer between the electrode assembly and the battery case, the retainer being disposed along an end of the electrode assembly, the retainer having peripheral members that extend away from a bottom surface of the battery case, the peripheral members contacting the electrode assembly and sides of the battery case.

The retainer may have a central member that joins the peripheral members, at least a portion of the central member being in contact with the battery case.

The peripheral members may be coupled together and the retainer may be a single integrated member.

The retainer may be a preformed plate having ends that are bent away from the bottom of the battery case, the ends forming the peripheral members.

The deformable member may be electrically insulating.

The deformable member may include at least one of silicone, rubber, and polypropylene.

BRIEF DESCRIPTION OF THE DRAWINGS

The above and other features and advantages will become more apparent to those of skill in the art by describing in detail example embodiments with reference to the attached drawings, in which.

DETAILED DESCRIPTION

In the drawing figures, dimensions may be exaggerated for clarity of illustration. It will be understood that when an element is referred to as being "on" another element, it can be directly on the other element, or one or more intervening elements may also be present. It will also be understood that when an element is referred to as being "under" another element, it can be directly under, or one or more intervening elements may also be present. It will also be understood that when an element is referred to as being "between" two elements, it can be the only element between the two elements, or one or more intervening elements may also be present. Like reference numerals refer to like elements throughout.

Figure 1:
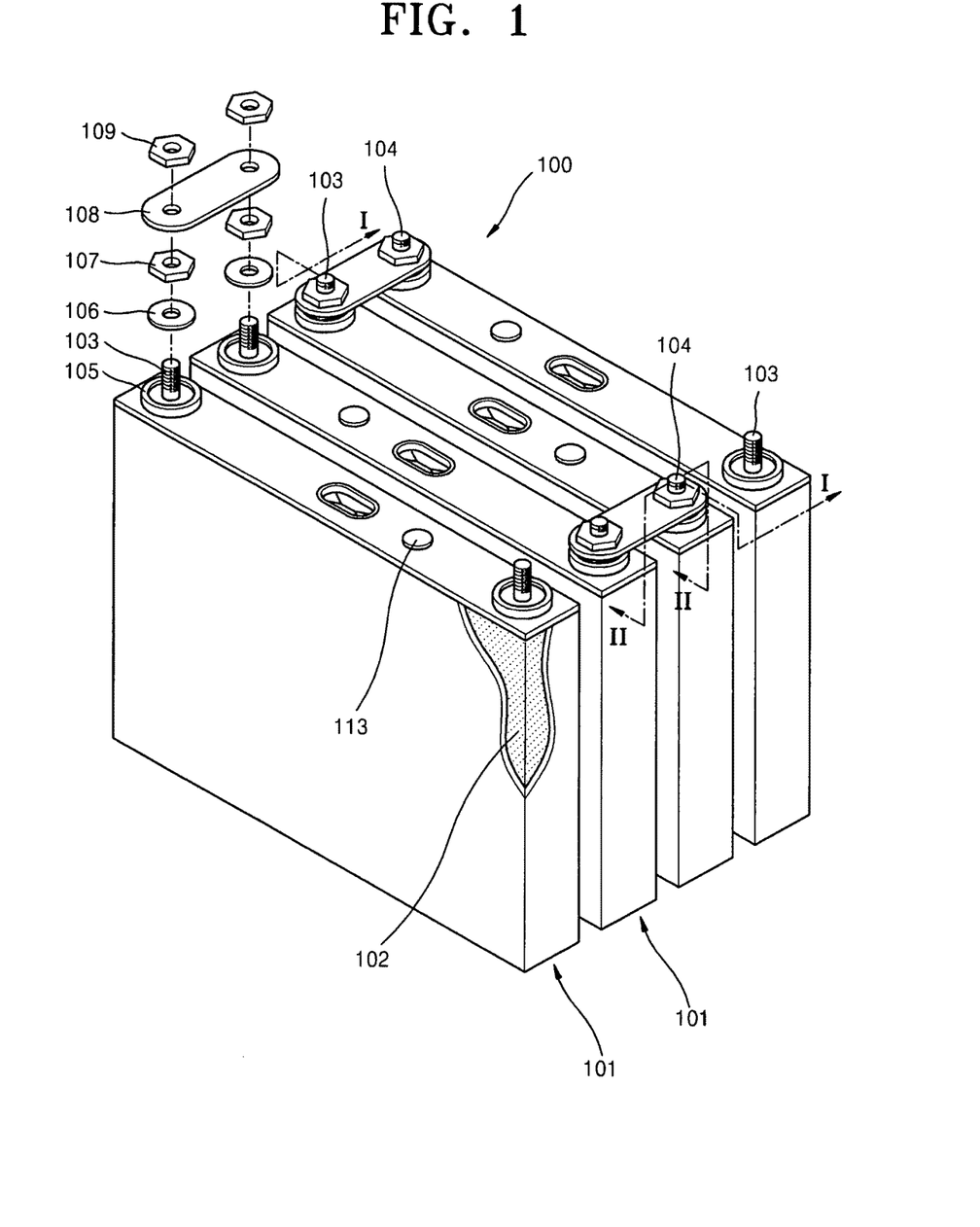
FIG. 1 illustrates a perspective view of a battery module according to a first embodiment.

FIG. 1 illustrates a perspective view of a battery module according to a first embodiment.

Referring to FIG. 1, the battery module 100 may include a battery unit 101. The battery unit 101 may include one or more electrode assemblies 102.

A positive electrode terminal 103 and a negative electrode terminal 104 may protrude from the battery unit 101. A washer 106, a nut 107, and an insulator 105 may be connected to each of the positive electrode terminal 103 and the negative electrode terminal 104.

In the battery module 100, a plurality of the battery units 101 may be connected together. For example, the battery units 101 may be electrically connected in series. The battery units 101 may be alternately arranged so that adjacent terminals of adjacent battery units have opposite polarities. The positive electrode terminal 103 of one battery unit 101 may be connected to the negative electrode terminal 104 of another, adjacent battery unit 101 via a bus bar 108. In an implementation, the positive electrode terminal 103 of the one battery unit 101 and the negative electrode terminal 104 of the other battery unit 101 may be connected to each other by the bus bar 108 with nuts 109 screwed thereon to secure the bus bar 108.

Figure 2:
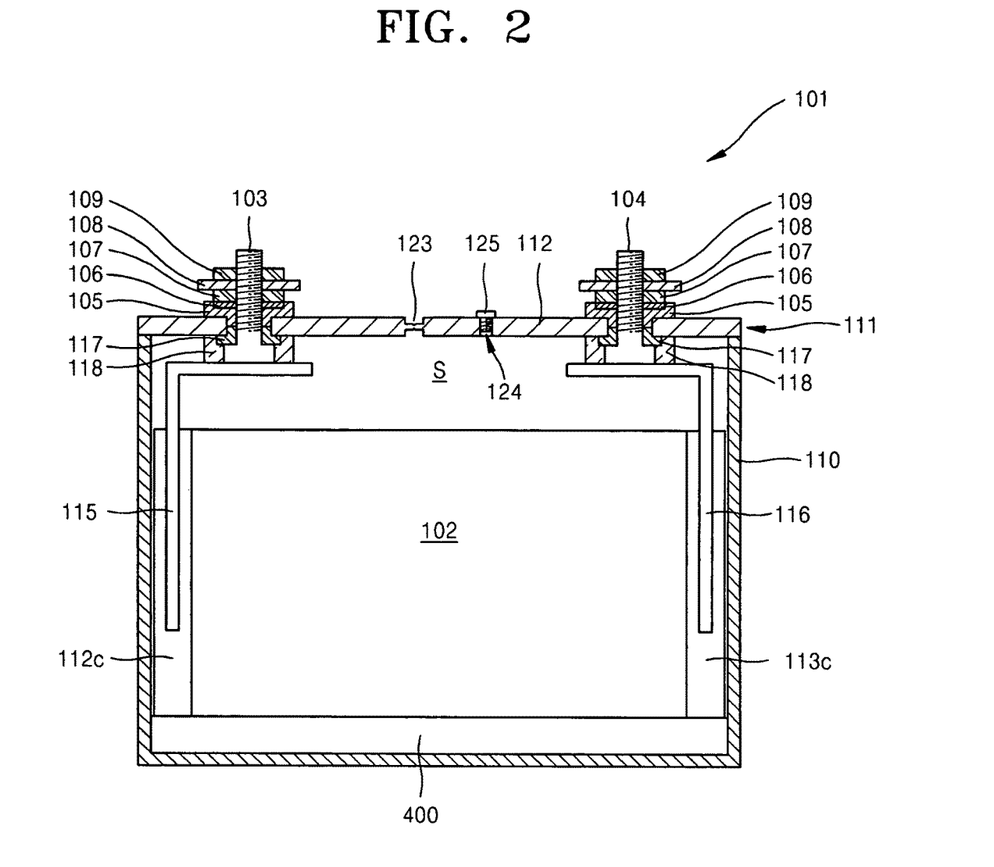
FIG. 2 illustrates a cross-sectional view of a battery unit cut along a line I-I of FIG. 1.
Figure 3:
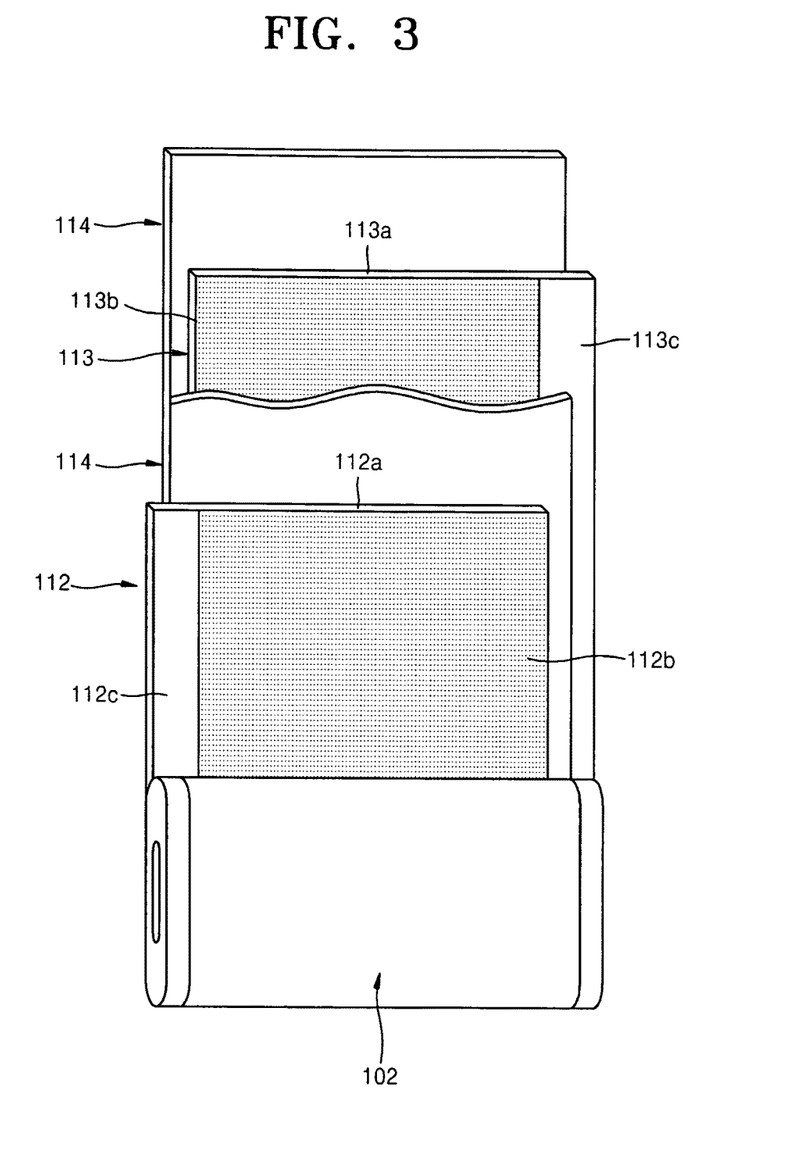
FIG. 3 illustrates aspects of an electrode assembly.

FIG. 2 illustrates a cross-sectional view of a battery unit cut along a line I-I of FIG. 1. FIG. 3 illustrates aspects of an electrode assembly.

Referring to FIGS. 2 and 3, the battery unit 101 may include the at least one electrode assembly 102, as well as a case 110 including the at least one electrode assembly 102. A cap assembly 111 may be installed on the case 110.

As shown in FIG. 3, the electrode assembly 102 may include a positive plate 112 and a negative plate 113. A separator 114 may be interposed between the positive plate 112 and the negative plate 113. The positive plate 112, the separator 114, and the negative plate 113 may be rolled to form a jelly-roll type electrode assembly. Two or more such jelly-roll type electrodes may be housed in the case 110.

For the positive plate 112, a positive active material layer 112b may be formed on at least one surface of a positive current collector 112a. Further, a positive electrode uncoated part 112c, on which the positive active material layer 112b is not formed, may be provided on one edge of the positive current collector 112a, e.g., along a longitudinal direction thereof.

For the negative plate 113, a negative active material layer 113b may be formed on at least one surface of a negative current collector 113a. Further, a negative electrode uncoated part 113c, on which a negative active material layer 113b is not formed, may be formed on one edge of the negative current collector 113a, e.g., along a longitudinal direction thereof.

The uncoated part 113c of the negative plate 113 may be opposite to the uncoated part 112c of the positive plate 112, such that the positive electrode uncoated part 112c and the negative electrode uncoated part 113c are arranged at edges that are opposite to each other in a width direction of the electrode assembly 102. The electrode assembly 102 may be inserted into the case 110 such that the positive electrode uncoated part 112c and the negative electrode uncoated part 113c are disposed on left and right sides of the electrode assembly 102, respectively.

The positive electrode uncoated part 112c may be electrically connected to a positive electrode current collector plate 115. The negative electrode uncoated part 113c may be electrically connected to a negative electrode current collector plate 116. An end of the positive electrode current collector plate 115 and an end of the negative electrode current collector plate 116 may be located in the upper space S in the case 110, the space S being formed between the electrode assembly 102 and the cap assembly 111. The positive electrode uncoated part 112c may be combined to the positive electrode current collector plate 115, and the negative electrode uncoated part 113c may be combined to the negative electrode current collector plate 116, respectively, using, e.g., ultrasonic welding.

The case 110 may be formed of a metal, e.g., aluminum, an aluminum alloy, nickel-plate steel, etc. In another implementation, the case 110 may be formed of an electrically insulating material. The case 110 may or may not be polarized, i.e., the case 110 itself may or may not form part of the electrical circuit of the battery. The size of the case 110 may be such that at least one electrode assembly 102 may be included therein. The case 110 may have a square shape or another suitable shape.

The cap assembly 111 may include a cap plate 112 that seals an upper opening 110b of the case 110. A bottom surface of the cap plate 112 may be combined to the case 110 along edges of an upper part of the case 110 and may seal an inner space of the case 110.

The cap plate 112 may include a safety vent 123. The safety vent 123 may open, e.g., irreversibly, to rapidly discharge gas out from the case 110 when an internal pressure of the case 110 is excessively increased.

The cap plate 112 may include an electrolyte injection hole 124 for injecting an electrolyte into the case 110. The electrolyte injection hole 124 may include a pin 125 that seals the electrolyte injection hole 124 after injection of an electrolyte.

The positive electrode current collector plate 115 may be electrically connected to the positive electrode terminal 103, which may be formed of a bolt. The positive electrode terminal 103 may protrude past a hole in the cap plate 112 by a predetermined amount from inside the case 110. At the hole of the cap plate 112 through which the positive electrode terminal 103 protrudes, the insulator 105 and a seal gasket 117 may be respectively inserted thereon and thereunder, to insulate the positive electrode terminal 103 from the cap plate 112. The positive electrode terminal 103 may extend through the insulator 105 and the seal gasket 117.

A washer 106 and a nut 107 may be placed onto the positive electrode terminal 103 protruding from the cap plate 112 and screwed thereon. The bus bar 108 may be fixed to the positive electrode terminal 103 protruding from the nut 107 so as to electrically connect to an adjacent battery unit 101. The nut 109 may be screwed on the bus bar 108 and thus the bus bar 108 may be fixed on the positive electrode terminal 103.

The positive electrode current collector plate 115 may be fixed on the positive electrode terminal 103 in the upper space S of the case 110, e.g., by caulking and laser welding. An insulating case 118 may be further installed around the positive electrode terminal 103 by being interposed between the positive electrode current collector plate 115 and the cap plate 112.

The negative electrode current collector plate 116 may be electrically connected to the negative electrode terminal 104, which may be formed of a bolt. The negative electrode terminal 104 may protrude past a hole in the cap plate 112 by a predetermined amount from inside of the case 110. An insulator 105, a seal gasket 117, and an insulating case 118 may be installed between the negative electrode terminal 104 and the cap plate 112 for insulating the negative electrode terminal 104 from the cap plate 112.

The at least one electrode assembly 102 may be installed in the battery unit 101. A bottom retainer 400 may be installed at a bottom of the case 110 in order to prevent movement of the electrode assembly 102, which will be described more fully below.

Figure 4:
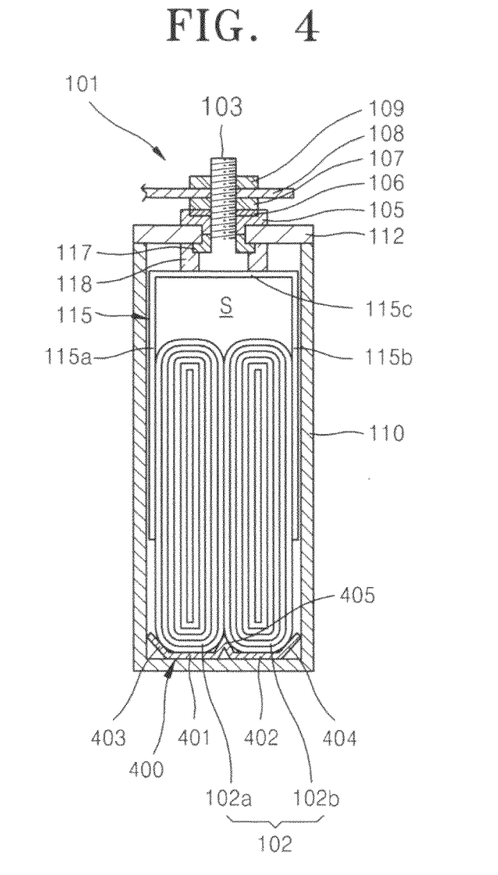
FIG. 4 illustrates a cross-sectional view of a battery unit cut along a line II-II of FIG. 1.
Figure 5:
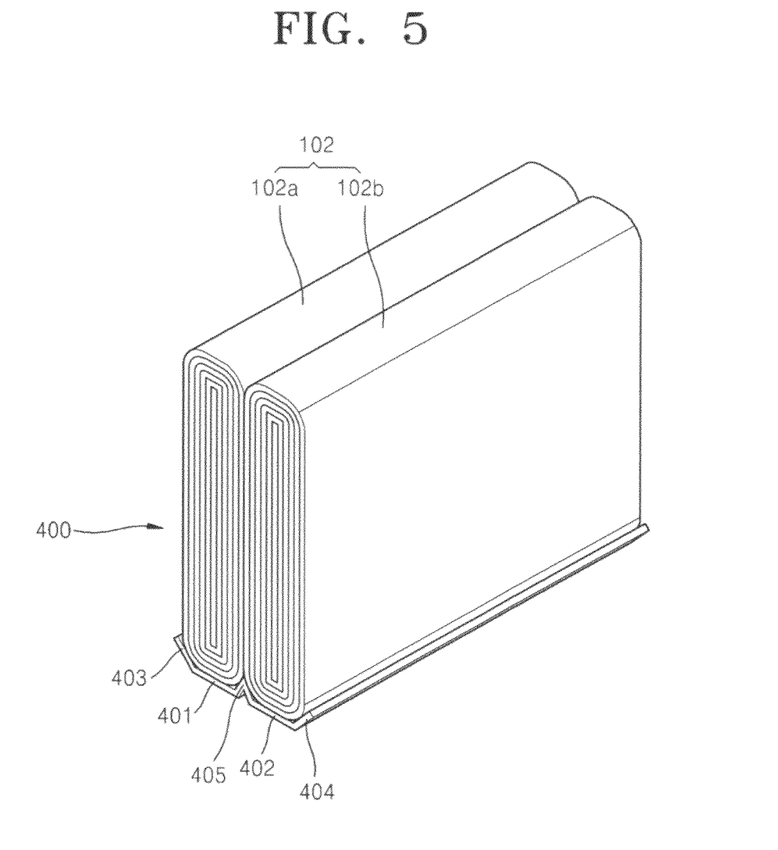
FIG. 5 illustrates a partial perspective view of the battery unit of FIG. 4.

FIG. 4 illustrates a cross-sectional view of a battery unit cut along a line II-II of FIG. 1. FIG. 5 illustrates a partial perspective view of the battery unit of FIG. 4.

Hereinafter, connections regarding a positive plate are described in the current embodiment; however, the current embodiment may be also applied to a negative plate.

As shown in FIGS. 4 and 5, the electrode assembly 102 is included in the case 110. The electrode assembly 102 according to the current embodiment includes a first electrode assembly 102a and a second electrode assembly 102b. However, the current embodiment is not limited thereto, and one or more electrode assemblies 102 may be included in the case 110.

The positive electrode current collector plate 115 may include a plurality of collector leads, e.g., first and second positive electrode current collector leads 115a and 115b, as well as a positive electrode current collector connector 115c that connects the positive electrode current collector leads 115a and 115b.

The first positive electrode current collector lead 115a may be electrically connected to the first electrode assembly 102a and the second positive electrode current collector lead 115b may be electrically connected to the second electrode assembly 102b. The first positive electrode current collector lead 115a and the second positive electrode current collector lead 115b may be connected to a positive electrode current collector of the first electrode assembly 102a and a positive electrode current collector of the second electrode assembly 102b, respectively, using, e.g., ultrasonic welding. The first positive electrode current collector lead 115a and the second positive electrode current collector lead 115b may be connected to the positive electrode current collector at one edge of the first electrode assembly 102a and the positive electrode current collector at one edge of the second electrode assembly 102b, respectively.

The first positive electrode current collector lead 115a and the second positive electrode current collector lead 115b may be integrally connected to each other by the positive electrode current collector connector 115c in the upper space S in the case 110. The positive electrode current collector connector 115c may be bent with respect to the first positive electrode current collector lead 115a and the second positive electrode current collector lead 115b. The positive electrode terminal 103 may be fixed to an upper surface of the positive electrode current collector connector 115c, e.g., by caulking and laser welding.

An insulator 105, a seal gasket 117, and an insulating case 118 may be installed around the positive electrode terminal 103 for insulating the positive electrode terminal 103 from the cap plate 112.

The first electrode assembly 102a and the second electrode assembly 102b may be secured by the connections of the first positive electrode current collector lead 115a, the second positive electrode current collector lead 115b, the positive electrode current collector connector 115c, and the positive electrode terminal 103 in the upper space S in the case 110, which may help to prevent movement of the internal components of the battery unit 101.

The bottom retainer 400 may be installed at the bottom of the case 110 in order to prevent the first electrode assembly 102a and the second electrode assembly 102b from moving. The bottom retainer 400 may be configured as a plate having ends that contact outer side surfaces of the electrode assembly 102a and/or 102b. The bottom retainer 400 may be a plate having ends that are bent upward to positively engage the electrode assembly 102a and/or 102b, to thus positively engage the electrode assembly 102a and/or 102b and resist lateral motion thereof. In an implementation, the bottom retainer 400 may be a preformed and/or solid piece, and may thus provide a more positive engagement with the electrode assembly 102a and/or 102b than, e.g., a foam piece. The bottom retainer 400 may be an integral member, and may be formed by, e.g., thermoforming a plastic material, stamping a metal material, etc.

The bottom retainer 400 may include a first bottom 401 and a second bottom 402. The first bottom 401 and the second bottom 402 may be flat plates extended from one side to the other side along the bottom of the case 110.

A first transformed part 403 inclined by a predetermined angle towards an upper direction may be formed at an edge of the first bottom 401, and may extend along the longitudinal direction of the first bottom 401. In an implementation, opposing first transformed parts 403 may be integrally connected with the first bottom 401 along edges of the first bottom 401, such that the first electrode assembly 102a is located in an inner space formed by combining the first bottom 401 and the first transformed parts 403.

A second transformed part 404 inclined by a predetermined angle towards an upper direction may be formed at an edge of the second bottom 402, and may extend along the longitudinal direction of the second bottom 402. In an implementation, opposing second transformed parts 404 may be integrally connected with the second bottom 402 along edges of the second bottom 402, such that the second electrode assembly 102b is located in an inner space formed by combining the second bottom 402 and the second transformed parts 404.

The first bottom 401 and the second bottom 402 may disposed apart from one another, and may be integrally connected to each other at a part 405. The part 405 may be positioned where the first electrode assembly 102a and the second electrode assembly 102b are contacted with each other. Accordingly, the bottom retainer 400 may span and stabilize the first electrode assembly 102a and the second electrode assembly 102b, wherein the first electrode assembly 102a and the second electrode assembly 102b may be in the inner space formed by combining the first bottom 401 and the first transformed parts 403 and the inner space formed by combining the second bottom 402 and the second transformed parts 404, respectively.

The size of the inner space formed by combining the first bottom 401 and the first transformed parts 403, and the size of the inner space formed by combining the second bottom 402 and the second transformed parts 404, respectively, may be such that lower parts of the first electrode assembly 102a and lower parts of the second electrode assembly 102b are forcibly fixed thereto. The bottom retainer 400 may be separate from the electrode assembly 102 and the bottom surface 110a of the case 110. The bottom retainer 400 may not be fixed to the electrode assembly 102 or the bottom surface 110a of the case 110. The bottom retainer 400 may be held in place due to being pressed between the electrode assembly 102 and the bottom surface 110a of the case 110, but may float therebetween.

Lengths, i.e., longitudinal dimensions, of the first bottom 401 and the second bottom 402 may be long enough to cover lengths of the first electrode assembly 102a and the second electrode assembly 102b. Moreover, the height of the first transformed parts 403 and the second transformed parts 404 may be high enough to include predetermined areas of the lower parts of the first electrode assembly 102a and the second electrode assembly 102b therein.

The bottom retainer 400 may be formed of a material that may deform when the first electrode assembly 102a and the second electrode assembly 102b are inserted thereon, for example, an elastomer such as silicone or rubber, or a polymer resin such as poly propylene (PP).

Figure 6A:
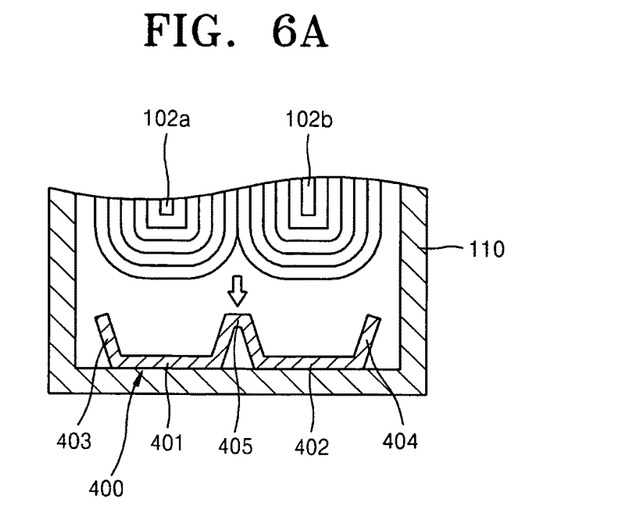
FIG. 6A illustrates a partial cross-sectional view of the battery unit of FIG. 4 showing a bottom retainer in a state before the bottom retainer is deformed.

The battery unit 101 is inserted into the case 110 as illustrated in FIG. 6A while the first electrode assembly 102a and the second electrode assembly 102b are respectively electrically connected to the positive electrode terminal 103 and the negative electrode terminal 104 protruding through the cap plate 112.

The bottom retainer 400 may first be installed at the bottom of the case 110. Then, the lower part of the first electrode assembly 102a may be located in the inner space formed by combining the first bottom 401 and the first transformed parts 403, and the lower part of the second electrode assembly 102b may be located in the inner space formed by combining the second bottom 402 and the second transformed parts 404.

Figure 6B:
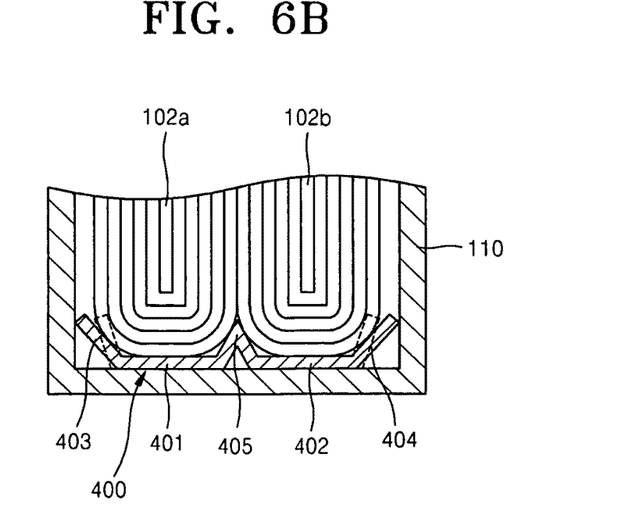
FIG. 6B illustrates a partial cross-sectional view of the battery unit of FIG. 4 showing the bottom retainer in a state after the bottom retainer is deformed.

As illustrated in FIG. 6B, when the electrode assembly 102 is installed on the bottom retainer 400, the lower part of the first electrode assembly 102a may deform a part of the bottom retainer 400 where the first bottom 401 and the first transformed parts 403 are connected to each other, and the lower part of the second electrode assembly 102b may deform a part of the bottom retainer where the second bottom 402 and the second transformed parts 404 are connected to each other.

As illustrated in FIGS. 6A and 6B, the electrode assembly 102, when forcibly fixed to the bottom retainer 400 as represented by an arrow in FIG. 6A, deforms the bottom retainer 400 such that the first transformed parts 403 and the second transformed parts 404 of the bottom retainer 400 are elastically deformed on the left and right sides of the case 110, as represented by dashed lines in FIG. 6B.

In an implementation, the first transformed parts 403 and the second transformed parts 404 contact inner walls of the case 11. The first electrode assembly 102a and the second electrode assembly 102b are elastically supported by the first transformed parts 403 and the second transformed parts 404. Accordingly, the first electrode assembly 102a and the second electrode assembly 102b may not be moved.

Figure 7:
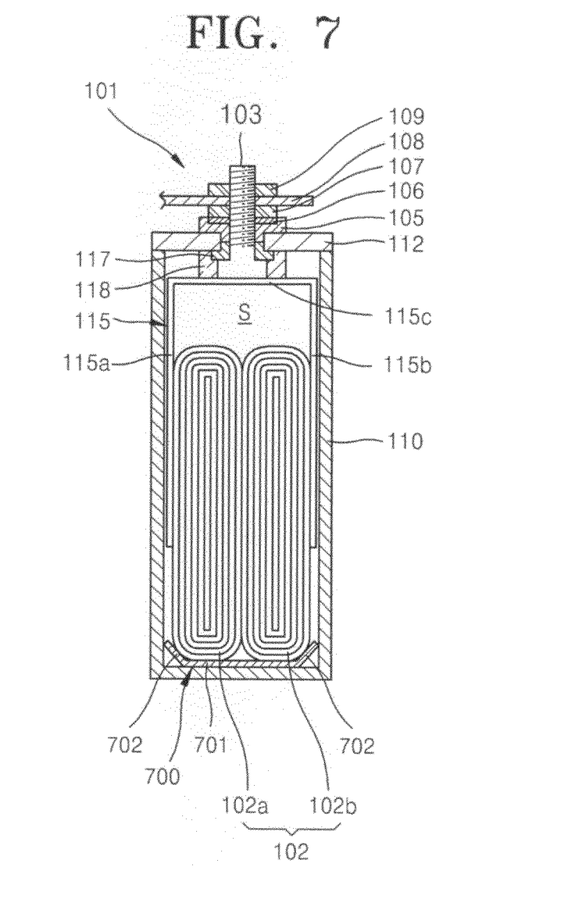
FIG. 7 illustrates a cross-sectional view of a battery unit according to another embodiment.

FIG. 7 illustrates a cross-sectional view of a battery unit according to another embodiment. Like reference numerals to those in the previous drawings denote like elements having the same functions.

Referring to FIG. 7, the first electrode assembly 102a and the second electrode assembly 102b may be installed in the case 110. A bottom retainer 700 may be installed at the bottom of the case 110 in order to prevent first electrode assembly 102a and the second electrode assembly 102b from moving.

As compared to the above-described embodiment, separate transformed parts (to include the first electrode assembly 102a and the second electrode assembly 102b in separate spaces) are not formed where the first electrode assembly 102a and the second electrode assembly 102b contact each other. Rather, the bottom retainer 700 includes a bottom 701 and lateral, i.e., peripheral, transformed parts 702 inclined by a predetermined angle towards an upper direction at two edges of the bottom 701 in a longitudinal direction. Each transformed part 702 may be integrally connected with the bottom 701. The first electrode assembly 102a and the second electrode assembly 102b may both be located in an inner space formed by combining the bottom 701 and the transformed parts 702.

The size of the inner space formed by combining the bottom 701 and the transformed parts 702 may be such that the lower parts of the first electrode assembly 102a and the lower part of the second electrode assembly 102b are forcibly fixed thereto. The size of the plurality of transformed parts 702 may be such that predetermined areas of the lower parts of the first electrode assembly 102a and the second electrode assembly 102b may be included therein.

Accordingly, when the electrode assembly 102 is installed on the bottom retainer 700, the bottom retainer 700 may be deformed and the electrode assembly 102 is elastically supported by the bottom retainer 700. Accordingly, the first electrode assembly 102a and the second electrode assembly 102b may not be moved.

As described above, according to the one or more of the above embodiments, the battery unit may have a bottom retainer formed of an elastomer, the bottom retainer being installed at a bottom of a case where at least one electrode assembly is included. When the electrode assembly inserted into the case, the electrode assembly may push on the bottom retainer and deform the bottom retainer, thereby supporting the electrode assembly by an elastic force of the bottom retainer. Accordingly, the electrode assembly may not be moved, and thus, vibration endurance of battery may be improved. A plurality of battery units, each including at least one electrode assembly and a corresponding bottom retainer, may be prepared and the plurality of battery units may be electrically connected to form a battery module.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:
1. A battery, comprising:
 a battery case, the battery case including a bottom surface inside the battery case;
 an electrode assembly in the battery case, the electrode assembly including a first plurality of windings that are wound about a first winding axis, the winding axis being oriented parallel to the bottom surface of the battery case; and
 a deformable member inside the battery case between the electrode assembly and the bottom surface of the battery case, the deformable member extending along the bottom of the case in a direction parallel to the first winding axis, and the deformable member directly contacting the electrode assembly and being pressed between the electrode assembly and the bottom surface of the battery case.

2. The battery as claimed in claim 1, wherein:
the electrode assembly has an outermost winding,
the outermost winding of the electrode assembly is a separator, and
the separator directly contacts the deformable member.

3. The battery as claimed in claim 1, wherein:
the electrode assembly includes a second plurality of windings in the battery case, the second plurality of windings being wound about a second winding axis, the second winding axis being oriented parallel to the first winding axis, and
the deformable member has lateral support portions that press against the first plurality of windings and the second plurality of windings.

4. The battery as claimed in claim 3, wherein the deformable member has at least one central support portion disposed between the lateral support portions, the central support portion being configured to press against a central region of the electrode assembly.

5. The battery as claimed in claim 4, wherein the deformable member has a W shape, the center of the W forming a central support portion disposed between the first plurality of windings and the second plurality of windings.

6. The battery as claimed in claim 1, wherein:
the deformable member includes lateral support portions that directly contact lower side regions of the electrode assembly along a direction parallel to the first winding axis,
the lateral support portions of the deformable member are coupled to one another, and
the deformable member is a single integrated member.

7. The battery as claimed in claim 6, wherein the deformable member is a preformed plate, ends of the plate being bent so as to extend away from the bottom surface of the battery case, the ends of the plate forming the lateral support portions.

8. The battery as claimed in claim 6, wherein the lateral support portions of the deformable member press against sides of the battery case.

9. The battery as claimed in claim 1, wherein the deformable member has a length in a direction parallel to the first winding axis that corresponds to a length of the electrode assembly in the direction parallel to the first winding axis.

10. The battery as claimed in claim 1, wherein the deformable member is not fixed to the electrode assembly and is not fixed to the battery case, such that the deformable member floats between the electrode assembly and the battery case.

11. The battery as claimed in claim 1, further comprising a cap plate coupled to the battery case, the cap plate having at least one electrode terminal extending therethrough, the electrode assembly being coupled to the at least one electrode terminal, wherein:
the cap plate is disposed at an end of the battery case that is opposite to the deformable member.

12. The battery as claimed in claim 1, wherein the deformable member is electrically insulating.

13. The battery as claimed in claim 1, wherein the deformable member includes at least one of silicone, rubber, and polypropylene.

14. A battery, comprising:
a battery case, the battery case including a bottom surface inside the battery case;
an electrode assembly in the battery case; and
a retainer between the electrode assembly and the battery case, the retainer being disposed along an outer surface of the electrode assembly, the retainer having peripheral members that extend away from the bottom surface of the battery case, the peripheral members directly contacting the outer surface of the electrode assembly and sides of the battery case, wherein the peripheral members are coupled together and the retainer is a single integrated member.

15. The battery as claimed in claim 14, wherein the retainer has a central member that joins the peripheral members, at least a portion of the central member being in direct contact with the bottom surface of the battery case.

16. The battery as claimed in claim 14, wherein the retainer is a preformed plate having ends that are bent away from the bottom surface of the battery case, the ends forming the peripheral members.

17. The battery as claimed in claim 14, wherein the retainer is electrically insulating.

18. The battery as claimed in claim 14, wherein the retainer includes at least one of silicone, rubber, and polypropylene.

* * * * *